(12) United States Patent
Gogsig et al.

(10) Patent No.: US 12,416,054 B2
(45) Date of Patent: Sep. 16, 2025

(54) APPARATUS FOR PROCESSING OF LEATHER

(71) Applicant: ECCO Sko A/S, Bredebro (DK)

(72) Inventors: Thomas Gogsig, Bredebro (DK); Ilona Francisca Maria Coremans, Bredebro (DK); Stojanka Petrusic, Bredebro (DK)

(73) Assignee: ECCO Sko A/S, Bredebro (DK)

( * ) Notice: Subject to any disclaimer, the term of this patent is extended or adjusted under 35 U.S.C. 154(b) by 942 days.

(21) Appl. No.: 17/607,188

(22) PCT Filed: Apr. 29, 2020

(86) PCT No.: PCT/DK2020/050118
§ 371 (c)(1),
(2) Date: Oct. 28, 2021

(87) PCT Pub. No.: WO2020/221406
PCT Pub. Date: Nov. 5, 2020

(65) Prior Publication Data
US 2022/0220570 A1 Jul. 14, 2022

(30) Foreign Application Priority Data
Apr. 29, 2019 (DK) .............. PA 2019 70267

(51) Int. Cl.
*C14C 15/00* (2006.01)
*D06P 1/94* (2006.01)
*D06P 3/32* (2006.01)

(52) U.S. Cl.
CPC .............. *C14C 15/00* (2013.01); *D06P 1/94* (2013.01); *D06P 3/32* (2013.01)

(58) Field of Classification Search
CPC .................... C14C 15/00; D06P 3/32
See application file for complete search history.

(56) References Cited

U.S. PATENT DOCUMENTS

| | | |
|---|---|---|
| 5,295,998 A | 3/1994 | Merritello et al. |
| 5,512,058 A | 4/1996 | Gavend et al. |
| (Continued) | | |

FOREIGN PATENT DOCUMENTS

| | | |
|---|---|---|
| CN | 1673394 A | 9/2005 |
| CN | 1693580 A | 11/2005 |
| (Continued) | | |

OTHER PUBLICATIONS

Covington, Tony, "Tanning Chemistry, The Science of Leather", The University of Northampton, Northampton UK, 2009, 11 pages.
(Continued)

*Primary Examiner* — Shaun R Hurley
(74) *Attorney, Agent, or Firm* — Lee & Hayes, P.C.

(57) ABSTRACT

An apparatus includes a process chamber, a controllable compressor for pressurizing a fluid, a pressure reducing member, an inlet for a processing agent and a controller. The process chamber is a pressure chamber. The controllable compressor pressurizes a fluid and introduces the pressurized fluid into the process chamber from a source. Further the controllable compressor controls a predefined pressure in the process chamber to reach a supercritical state of the fluid. An inlet for a processing agent facilitates introduction of the processing agent into the process chamber prior to, during, or subsequent to pressurization of the fluid. The pressure reducing member reduces the pressure of the fluid at least to reach a gaseous state subsequent to processing the leather object such that the time for reduction of pressure exceeds a predefined reduction period or the reduction of pressure does not exceed a predefined leather pressure reduction gradient.

16 Claims, 8 Drawing Sheets

(56) References Cited

U.S. PATENT DOCUMENTS

Figure 1:
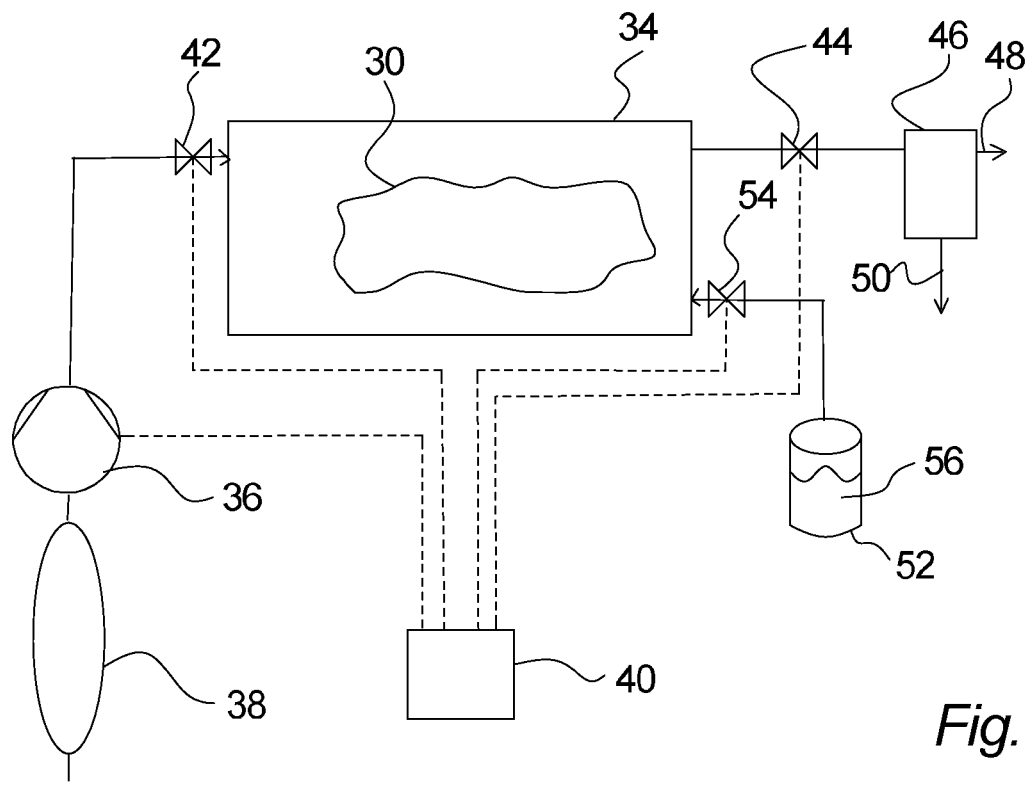

| | | | |
|---|---|---|---|
| 6,261,326 B1* | 7/2001 | Hendrix | D06B 23/205 |
| | | | 8/158 |
| 2002/0108183 A1 | 8/2002 | Smith et al. | |
| 2005/0214464 A1 | 9/2005 | Moriyoshi et al. | |
| 2005/0257572 A1* | 11/2005 | Van Schepdael | D06B 23/14 |
| | | | 68/3 R |
| 2017/0182523 A1* | 6/2017 | Chavrier | B08B 7/0021 |
| 2017/0341942 A1* | 11/2017 | Harper, Jr. | F01K 7/16 |

FOREIGN PATENT DOCUMENTS

| | | |
|---|---|---|
| CN | 1958941 A | 5/2007 |
| CN | 101270398 A | 9/2008 |
| CN | 105133396 A | 12/2015 |
| EP | 2014344 | 1/2009 |
| JP | 2015193969 | 11/2015 |
| WO | WO200131067 | 5/2001 |
| WO | WO200233163 | 4/2002 |
| WO | WO2018149949 | 8/2018 |
| WO | WO2018149950 | 8/2018 |

OTHER PUBLICATIONS

PCT Search Report for corresponding PCT Application No. PCT/DK2020/050118 dated Jul. 16, 2020, 4 pages.

* cited by examiner

APPARATUS FOR PROCESSING OF LEATHER

This Application claims priority to PCT Application No. PCT/DK2020/050118, filed Apr. 29, 2020, which claims priority to DK Patent Application No. PA 2019 70267, filed Apr. 29, 2019, the contents of each of which is incorporated herein by reference.

FIELD OF THE INVENTION

The invention relates to an apparatus for processing of leather objects.

BACKGROUND OF THE INVENTION

It is well known within the art of leather making, that dyeing is one of the more important steps as it is usually the first property of the leather to be assessed by the costumer. Dyeing of leather is currently mainly performed with acid dyes, sulfur dyes, direct dyes, premetallized dyes, reactive dyes or basic dyes under wet conditions but acceptable high depths of the color and high wet fastness are difficult and improved solutions are desirable. It is also well-known that water and processing agents such as dye, retanning agents and fatliqour agents are used in large amounts in the leather dyeing processes and may also be energy costly.

An object of the invention is therefore to provide for an advantageous and more environmentally sustainable dyeing method with a high dyeing efficiency and high wet fastness. A further object is assuring the leather quality with all common physical and chemical test standards including high color fastness.

SUMMARY OF THE INVENTION

The invention relates to an apparatus for processing of leather objects, said leather objects being pre-treated at least by a tanning process, said apparatus comprising
   a process chamber,
   a controllable compressor for pressurizing a fluid,
   a pressure reducing member,
   an inlet for a processing agent and
   a controller,
   wherein
   said process chamber is configured in the form of a pressure chamber,
   said controllable compressor for pressurizing a fluid is configured for introducing pressurized fluid into the process chamber from a source of said fluid, controlled by the controller, and further for providing a predefined pressure in the process chamber in order to reach a supercritical state of said fluid,
   said inlet for a processing agent is configured for facilitating introduction of said processing agent into the process chamber prior to, during or subsequent to pressurization of the fluid, and wherein
   said pressure reducing member is configured for, controlled by the controller, reducing the pressure of the pressurized fluid at least to reach a gaseous state subsequent to processing of said leather object such that
      the time for reduction of pressure exceeds a predefined reduction period or
      the reduction of pressure does not exceed a predefined leather pressure reduction gradient.

Hereby, the dyeing of leather objects can be achieved using the apparatus according to the invention, which in contrast to conventional dyeing machines or drums is exceptional in that use of relatively large amounts of water is avoided and due to the reduced process time may also use less energy. This is achieved by use of a dyeing and/or retanning agent that is soluble and/or transported in the pressurized fluid at least when this is in the supercritical state and whereby the dissolved dyeing agent in combination with the pressurized fluid in the supercritical state can penetrate into the leather structure including at least part of the inner structure and perform an effective colouring of not only the surface of the leather structure but also in the structure below, e.g. collagen fibres in the leather structure. Other retanning and/or dyeing agent may also be carried or transported by the pressurized fluid. In other words, the retanning and/or dyeing agent must not necessarily be dissolved in the pressurized fluid as long as a resulting dyeing and/or retanning is obtained. Retanning and/or dyeing agent may be carried and/or transported by the pressurized fluid e.g. due to the flowrate of the pressurized fluid in the supercritical state.

The step of reducing the pressure in the process chamber, e.g. at the end of the dyeing step, comprises control by a controller in order to reduce the pressure of the pressurized fluid in a controlled manner such that a suitable pressure reduction gradient over a given time is maintained. Controlling the reduction gradient is an advantage for the leather objects to maintain desirable characteristics that are vital for its long term use, e.g. preserving the colour and surface characteristics such that any tendency to leather delamination is minimized or even completely avoided and such that leather delamination preventive requirements are met. This may involve setting minimum periods for reducing the pressure, setting maximum numbers for the pressure reduction gradient, setting maximum numbers for a mean pressure reduction gradient or the like, which will ensure that the leather structure and in particular the leather structure that has been dyed by the dyeing agent and been penetrated by the pressurized fluid in the supercritical state, will not be detrimentally affected during the pressure reduction.

It is noted that in an embodiment, "a leather object" is being processed, but it will be clear that two or more leather objects may be processed at the same time.

Furthermore, it should be noted that the processing agent, e.g. dyeing agent may be introduced into the process chamber at any convenient stage and in any convenient manner, e.g. into the process chamber prior to the leather object being introduced, at the same time as the leather object being introduced, prior to or together with the pressurized fluid being introduced, when the pressurized fluid has reached the supercritical state, etc.

According to an embodiment of the invention tanning is generally understood as the conversion of a putrescible organic material into a stable material capable of resisting biochemical attack.

In should be noted that a controller is referring to a control arrangement of one or more interacting electrical circuits which may be pre-configured or to be configured to execute a certain desired method, e.g. the methods claimed and described in the present invention, e.g. in the disclosed apparatus. The controller may thus include RAM or ROM memory.

Thus, the method of dyeing and/or retanning of leather may be applied with various degrees of automation, including in an essentially fully automated manner, e.g. for example comprising an automation, partially or fully of one or more of the steps of providing a leather object, which leather object has been processed by at least a tanning process, introducing the leather object into a process chamber, subjecting the leather object in the process chamber to a pressurized fluid, controlling the pressure of the pressurized fluid to reach a supercritical state, subjecting the leather object to a processing agent, which processing agent is dissolved in or carried/transported by the pressurized fluid for at least a predefined period of time while the pressurized fluid is in the supercritical state, and/or subjecting the leather object to a retanning agent while the leather object is in the pressurized fluid in the supercritical state reducing the pressure in the process chamber, removing the leather object from the process chamber, wherein the step of reducing the pressure in the process chamber comprises controlling the pressure reduction over time.

According to further embodiments, the method may be applied in an at least partially automated manner by incorporating automation of steps and/or features as exemplified in the dependent claims.

In an embodiment of the invention, the apparatus is configured for pressurizing the pressurized fluid in the process chamber to reach a supercritical state, controlled by the controller, such that the time for increasing the pressure exceeds a predefined increase period or the increase of pressure does not exceed a predefined leather pressure increase gradient.

In an embodiment of the invention, said fluid is CO2.

The pressurized CO2 may have a purity of at least 99.0%, and preferably at least 99.9%. The pressurized fluid comprising $CO_2$ may have a purity of up to 99.99%.

In an embodiment of the invention, the source of the fluid is a storage container.

In an embodiment of the invention, said process chamber comprises a closeable member for inletting and outletting leather objects.

Hereby, the leather material either as a whole piece or as objects or both can be placed in the process chamber. The placement in the process chamber can be made as a manually process or as an automated process or in combination of both.

In an embodiment of the invention, said pressure reducing member comprises a pressure reducing valve.

Hereby, the pressure reducing member comprising a reducing valve can reduce the pressure from supercritical state to non-supercritical state that a suitable pressure reduction gradient over a given time is maintained.

In an embodiment of the invention, said pressure reducing member is controlled in dependence of time and/or at least one pressure sensor variable.

Hereby, the pressure reduction is controlled in a highly advantageous manner.

In an embodiment of the invention, the apparatus further comprising a separator connected to an outlet of said pressure reducing member, said separator being configured for separating processing agent residue from the fluid.

Hereby, superfluous dyeing agent may be reused, and the purity of the pressurized fluid maintained and reused.

In an embodiment of the invention, said apparatus comprising a pipe for recycling fluid from the separator to a storage container operating as a fluid source for the apparatus. Hereby, the fluid may be reused in an advantageous cost-efficient manner.

In an embodiment of the invention, said apparatus comprises a further compressor for pumping fluid from the separator to the storage container.

In an embodiment of the invention, said inlet for a processing agent comprises one of an inlet direct to the process chamber, an inlet to the fluid being pressurized to be introduced into the process chamber, and an inlet combined with an inlet for skin, hide or leather objects into the process chamber.

In an embodiment of the invention, the predefined pressure in the process chamber in order to reach a supercritical state of said fluid is at least 70 bar, such as between 70 to 260 bar, such as 90 to 150 bar, such as 130 to 250 bar, or such as 180 to 240 bar.

In an embodiment of the invention, the apparatus further comprises temperature control apparatus, controlled by the controller, for maintaining the temperature of the pressurized fluid, which is in the supercritical state in the process chamber, in a temperature range of between 30 to 120 degrees Celsius, such as 30 to 100 degrees Celsius, such as 30 to 80 degrees Celsius, such as between 30 to 60 degrees Celsius, such as between 30 degrees Celsius to 50 degrees Celsius, such as between 30 degrees Celsius to 40 degrees Celsius.

In an embodiment of the invention, the pressure reducing member that is configured for reducing the pressure of the pressurized fluid at least to reach a gaseous state subsequent to processing of said leather object, is configured such that the reduction period exceeds a time interval of 5 min, such as a time interval between 5 min. to 2 hours, such as 15 min. to 45 min., such as 15 min. to 30 min, such as 30 min. to 2 hours, such as 30 min. to 65 min.

Hereby, depressurization to ambient is maintained in a controlled manner.

In an embodiment of the invention, the apparatus further is configured for reducing the pressure of the pressurized fluid in the process chamber to a level corresponding to ambient pressure subsequent to processing of said leather object.

In an embodiment of the invention, the pressure reducing member that is configured for reducing the pressure of the pressurized fluid at least to reach a gaseous state subsequent to processing of said leather object, is configured such that the reduction of pressure does not exceed said predefined leather pressure reduction gradient such as 10 bar/min, such as 8 bar/min, such as 6 bar/min or such as 4 bar/min.

In an embodiment of the invention, the apparatus is configured such that the time for increasing the pressure to reach a supercritical state exceeds a predefined increase period of between 5 min. to 1 hour, such as 15 min. to 45 min., such as 15 min. to 30 min.

In an embodiment of the invention, the apparatus is configured such that the pressurizing of the pressurized fluid in the process chamber to reach a supercritical state, controlled by the controller, comprises that the increase of pressure does not exceed a predefined leather pressure increase gradient such as 20 bar/min, such as 15 bar/min, such as 10 bar/min, such as 8 bar/min, such as 6 bar/min, such as 5 bar/min or such as 4 bar/min.

In an embodiment of the invention, the apparatus further is configured for providing at least a partial flow of the pressurized fluid in the supercritical state in the process chamber during processing of said leather object, e.g. by circulation of the pressurized fluid, by stirring, etc.

In an embodiment of the invention, the processing agent is a dyeing agent.

The dyeing agent is any dye relevant for dyeing leather and textile and at least one type of dye selected from the group of acid dyes, basic dyes, direct dyes, reactive dyes, chrome dye, milling dye, premetallized dyes, mordant dyes and sulfur dyes, disperse dyes, reactive disperse dyes and natural based dyes.

An example of a natural based dye may be e.g. rose extract.

In an embodiment of the invention, the dyeing agent is a collagen reactive dyeing agent.

Hereby, the dyeing process may be performed in a particular advantageous manner since for example leather priming, which might be mandatory in connection with traditional leather dying agents, can be avoided. Thus, a simplified process can be achieved. The avoidance of leather priming is achieved by using dyes with affinity to non-primed collagen fibers in the leather and a highly advantage is intensive colors in the leather cross-section as dye anchors to all available collagen reactive sites.

Examples of reactive dyes may be Levafix Brilliant Blue E-BRAN (dye having C.I 114 of Dystar Japan Ltd.), Levafix Brill. Red E-RN gran (Dystar Japan Ltd.), Levafix Golden Yellow E-G (dye having C.I27 of Dystar Japan Ltd.), Eriofast RedB (Ciba Specialty Chemicals), Cibacron Red P-BN GRAN (Ciba Specialty Chemicals), Lanasol Red 6G (dye having C.I 84 of Ciba Specialty Chemicals).

In an embodiment of the invention the processing agent is a retanning agent.

Hereby, the retanning agent may give the leather fullness with selective filling of the structure and to provide a tight and uniform grain surface for leather finishing.

It should be noted that the present invention may be applied with a special advantage in relation to dye, but that the apparatus and method described herein also may be applied for the processing of leather with retanning agent in general. A retanning or a part of a retanning process may thus be performed e.g. by the application of supplementary tanning agent such as inorganic or organic substances. Inorganic retanning agent which could be applied instead of the above identified dye this include chrome, aluminium, zirconium salts. Organic retanning agents include vegetable tannins, syntans, resins and aldehydes.

In an embodiment of the invention, said apparatus is configured for controlling the pressure and temperature of the fluid in the supercritical state to achieve and/or maintain a desired density of the fluid in the supercritical state, e.g. a constant value of the density.

In an embodiment of the invention, the predetermined time, during which the leather object is subjected to the processing agent in the pressurized fluid in the supercritical state, is at least 1 min., such as at least 15 min., such as between 15 min. and 4 hours, such as between 25 min. and 2 hours, such as in excess of 35 min.

In an embodiment of the invention, the predetermined time during which the leather object is subjected to the dyeing agent in the pressurized fluid in the supercritical state, is at least 1 min., such as at least 15 min., such as between 1 min. and 40 minutes, such as between 1 min. and 4 hours, such as between 5 min. and 2 hours, such as in excess of 15 and below 1 hour.

The invention further relates to a method for processing of leather objects, said method comprising the steps of providing a leather object, which leather object has been processed by at least a tanning process, introducing the leather object into a process chamber, subjecting the leather object in the process chamber to a pressurized fluid, controlling the pressure of the pressurized fluid in the process chamber to reach a supercritical state, subjecting the leather object to a processing agent via the pressurized fluid in the supercritical state, wherein the processing agent is introduced into the process chamber prior to, during or subsequent to pressurization of the fluid, reducing the pressure in the process chamber at least to reach a gaseous state, removing the leather object from the process chamber, wherein the step of reducing the pressure in the process chamber at least to reach a gaseous state comprises that the time for reduction of pressure exceeds a predefined reduction period or the reduction of pressure does not exceed a predefined leather pressure reduction gradient.

In an embodiment of the invention, the step of controlling the pressure of the pressurized fluid in the process chamber to reach a supercritical state comprises that the time for increasing the pressure exceeds a predefined increase period or the increase of pressure does not exceed a predefined leather pressure increase gradient.

In an embodiment of the invention, said method utilizing an apparatus according to the invention.

THE FIGURES

Figure 5:
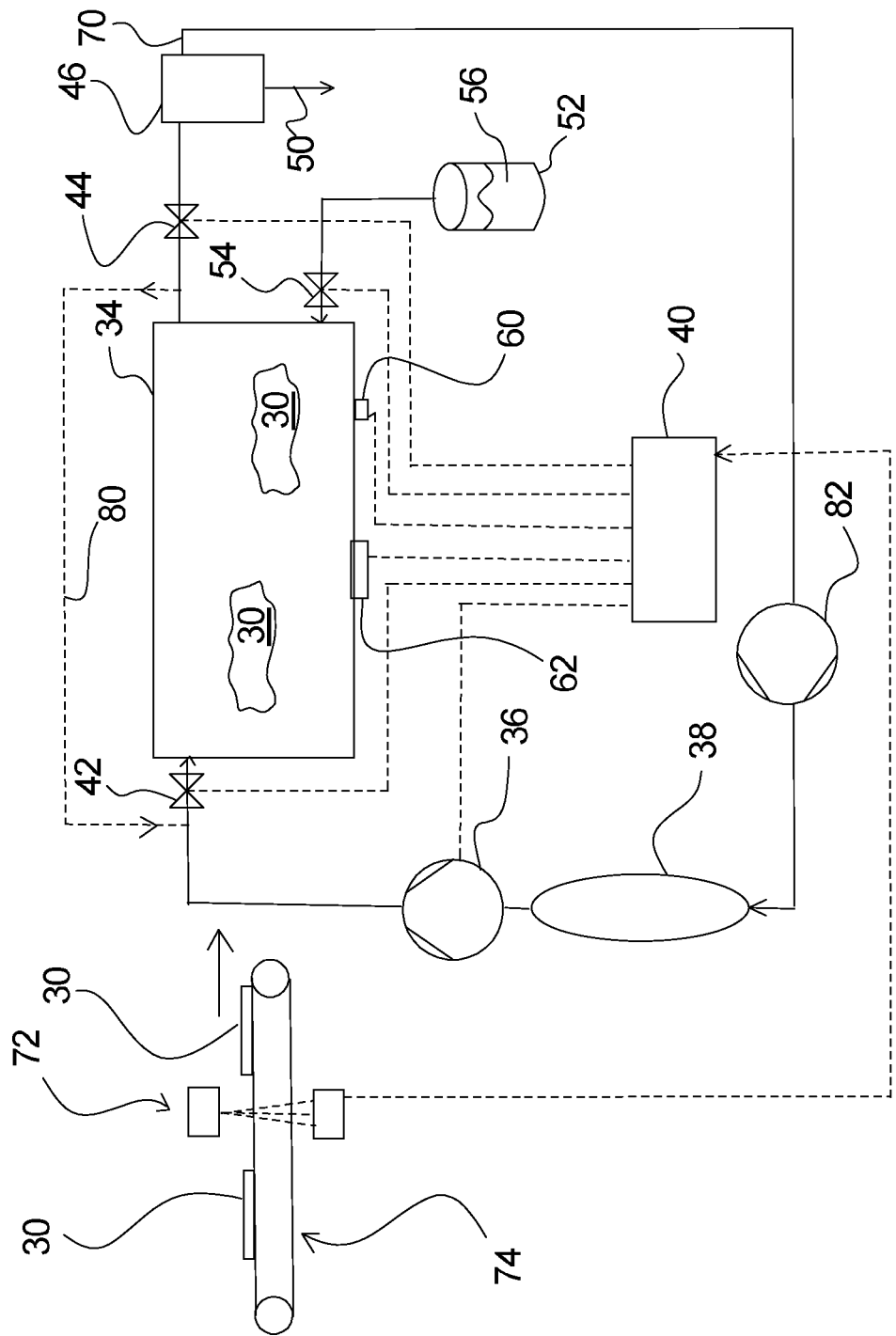
Figure 6:
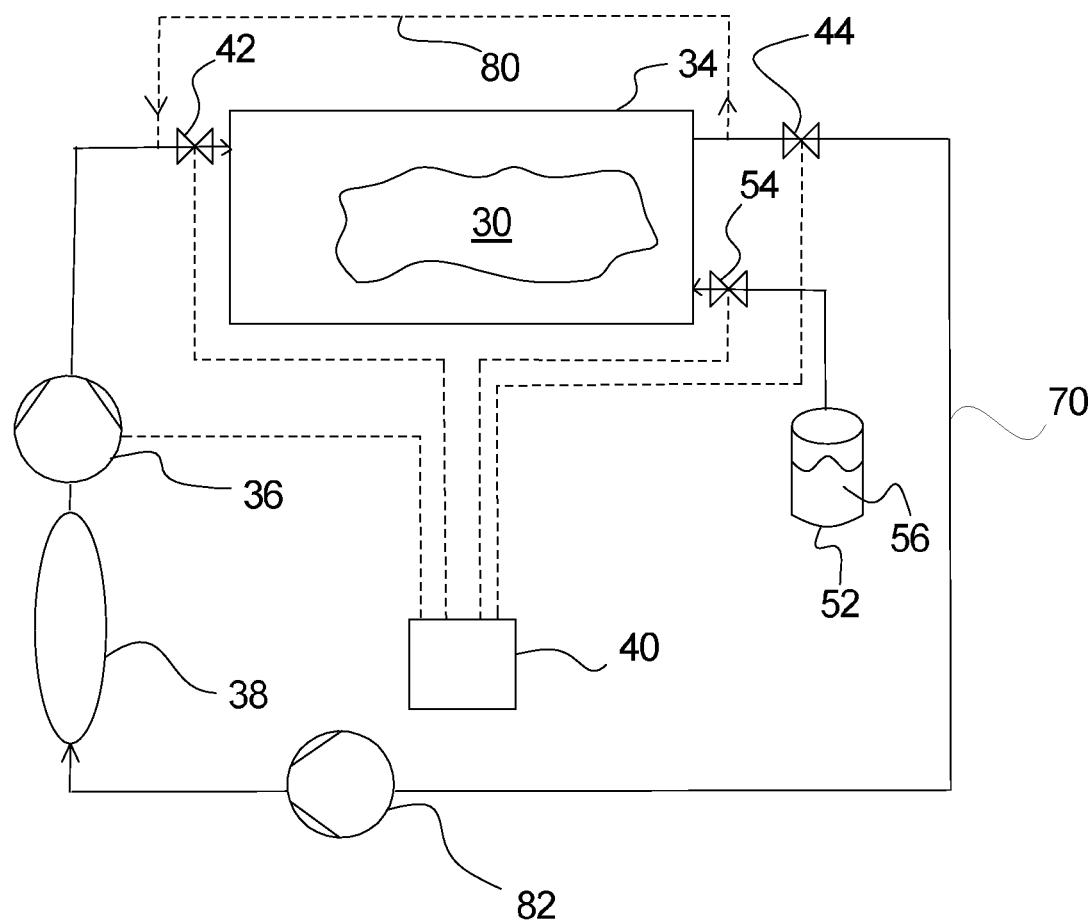
Figure 7:
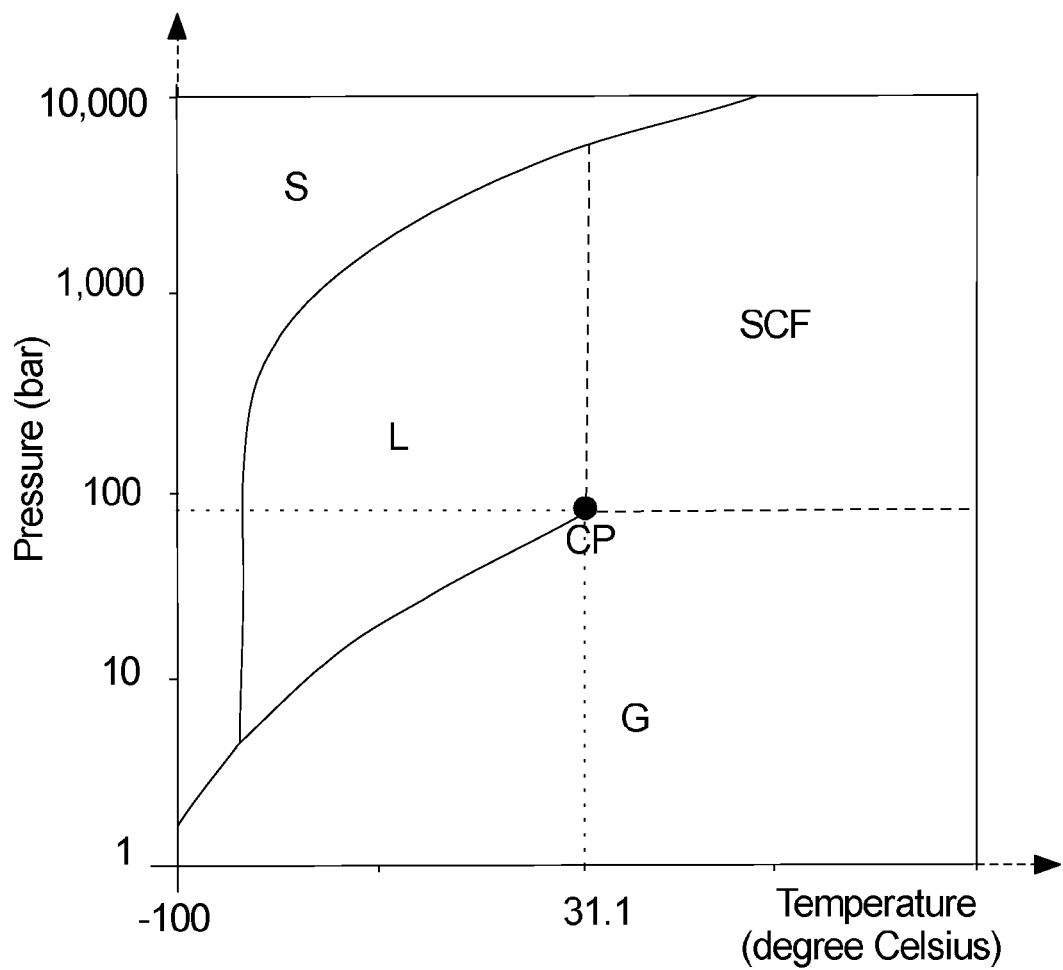
Figure 8A:
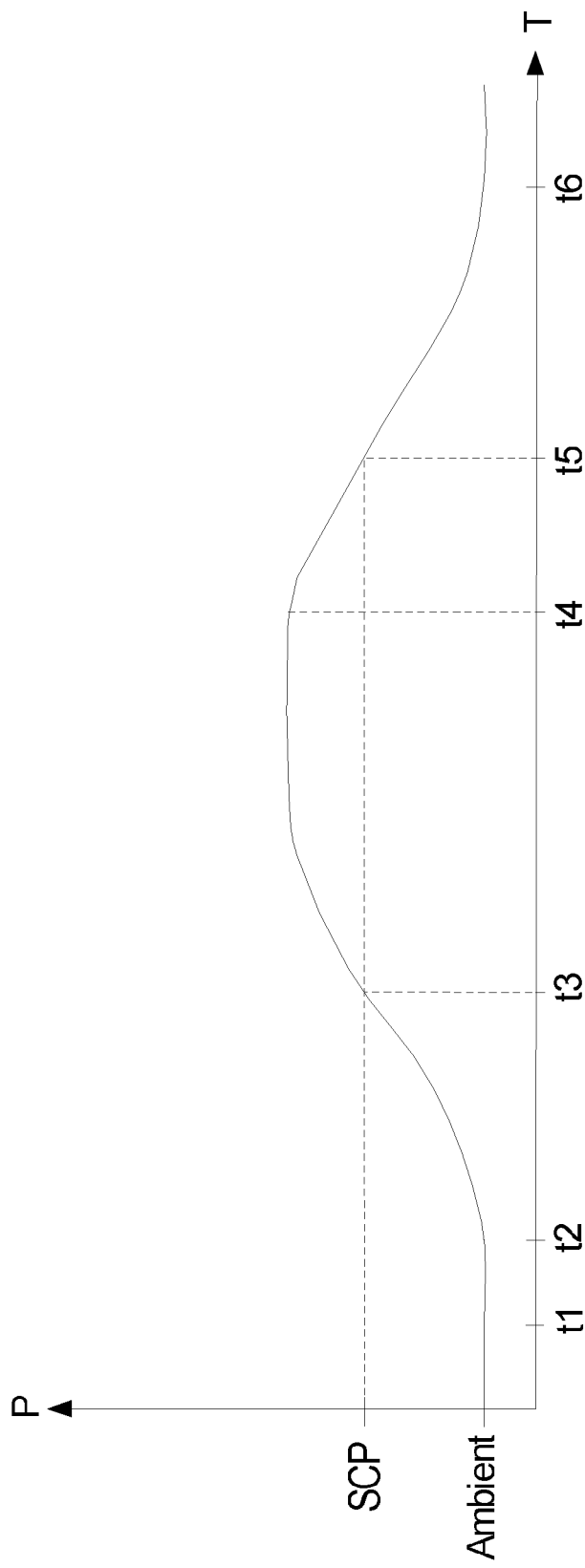
Figure 8B:
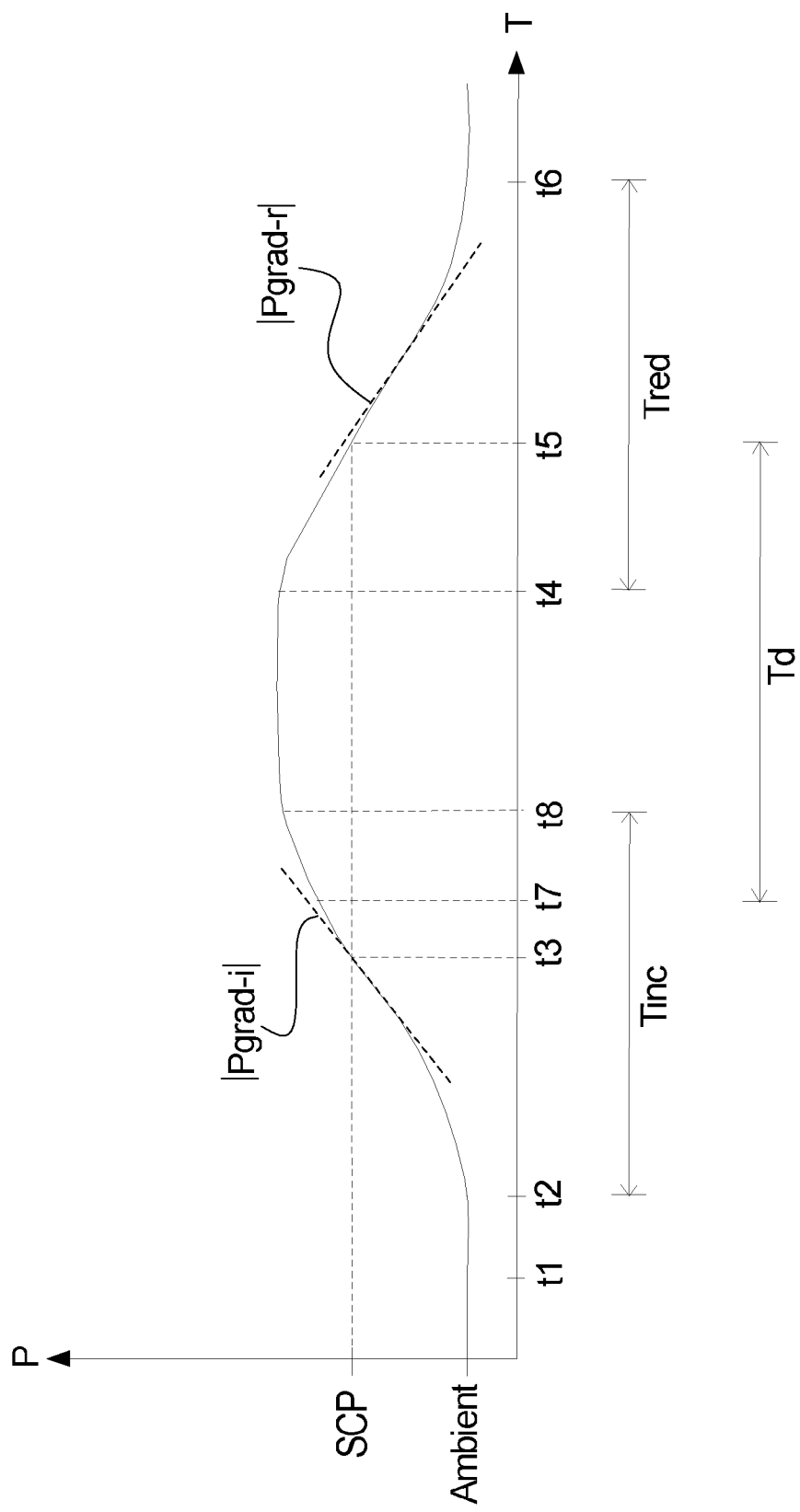
Figure 9:
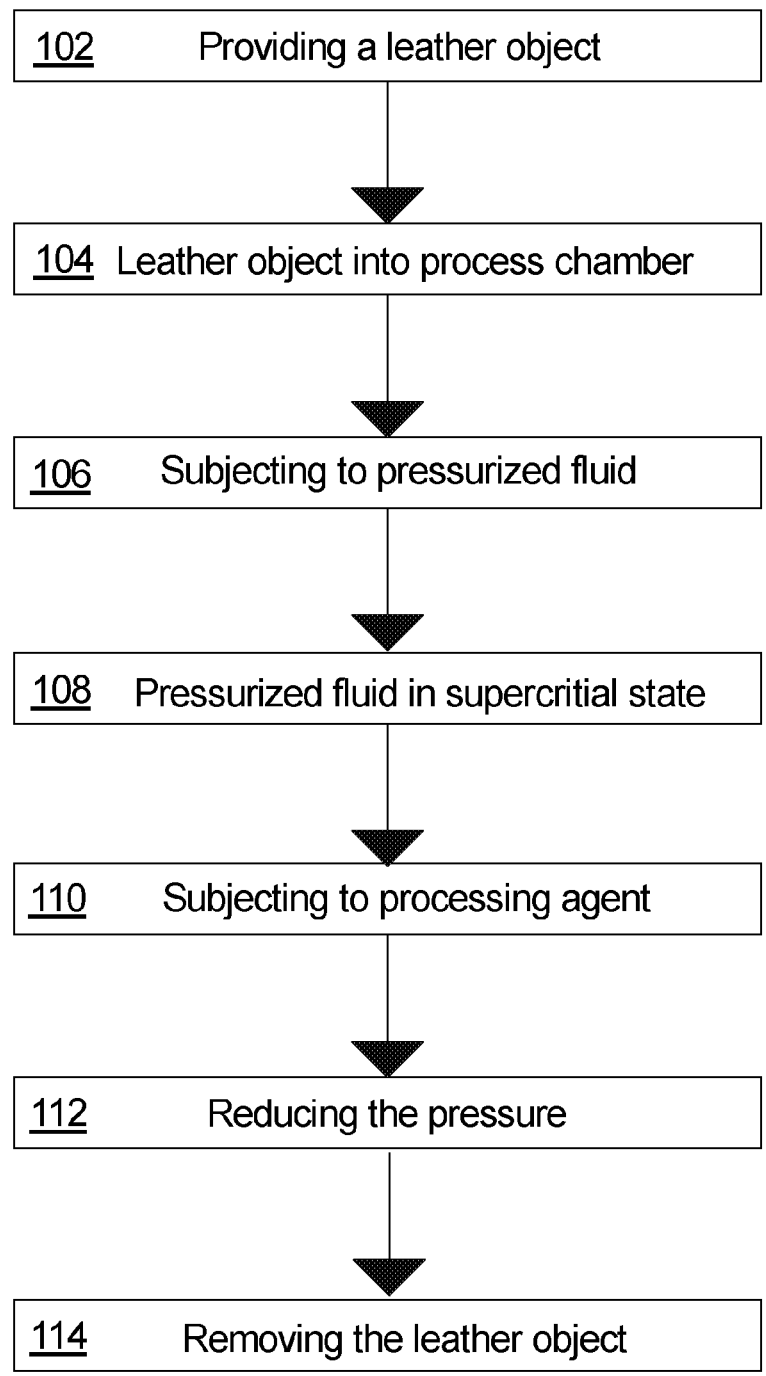

For a more complete understanding of this disclosure, reference is now made to the following brief description, taken into connection with the accompanying drawings and detailed description, wherein like reference numerals represent like parts:

FIG. 1-6 illustrates examples of an apparatus for processing e.g. dyeing and/or retanning according to embodiments of the invention, FIG. 7 illustrates a phase diagram for carbon dioxide, FIGS. 8a and 8b illustrates an example of a graph of pressure over time and FIG. 9 illustrates an example of a processing method for processing of leather objects according to an embodiment of the invention.

DETAILED DESCRIPTION

FIG. 1 illustrates an example of an apparatus in an embodiment of the invention.

A leather object 30 is processed in a process chamber 34. The process chamber may be configured in the form of a pressure chamber. The pressure chamber may be in connection to at least one controllable compressor 36 for pressurizing a fluid, which is supplied from a storage container 38 e.g. a high pressure storage container. The pressure provided by the controllable compressor 36 is introduced to the pressure chamber 34 by an introducing member 42, e.g. a controllable valve or the like. At an output end the pressure can be reduced by a pressure reducing member 44, e.g. in the form of a controllable valve, pressure reducing valve or the like. The apparatus according to an embodiment of the invention, may also comprise a separator 46, which receives the escaping pressurized fluid and where for example residue dyeing agent may be separated from the pressurized fluid. The pressurized fluid can leave the separator 46 via an outlet 48 and the separated residue dyeing agent may be collected via a residue outlet 50. A processing agent 56 is introduced from the source of processing agent 52 into the process chamber via a controllable inlet 54, e.g. a controllable valve or the like, and in a preferred embodiment of the invention, the processing agent is a dye. The introduction and release of pressure and introduction of dye are controlled by a controller 40, where the controller 40 as illustrated may be connected to the controllable compressor 36, the introducing member 42, the controllable inlet 54 and the pressure reducing member 44 to control these in dependence on such parameters as time, pressure, temperature, characteristics of the leather object, etc. Furthermore, the control may also be performed in relation to circulation flow rate, speed of movable process chamber, stirrer etc. Thus, it will be understood that the apparatus may be equipped with corresponding sensors, e.g. pressure sensors, temperature sensors, etc. and that sensor signals may be communicated to the controller 40 as further input for the control of the apparatus.

The pressurized fluid may be circulated and reused from the pressurized chamber back in the pressurized chamber. The pressurized fluid may also or as a single process step be circulated and reused after leaving the separator and via a recirculation compressor lead back into the high pressure storage container.

Figure 2:
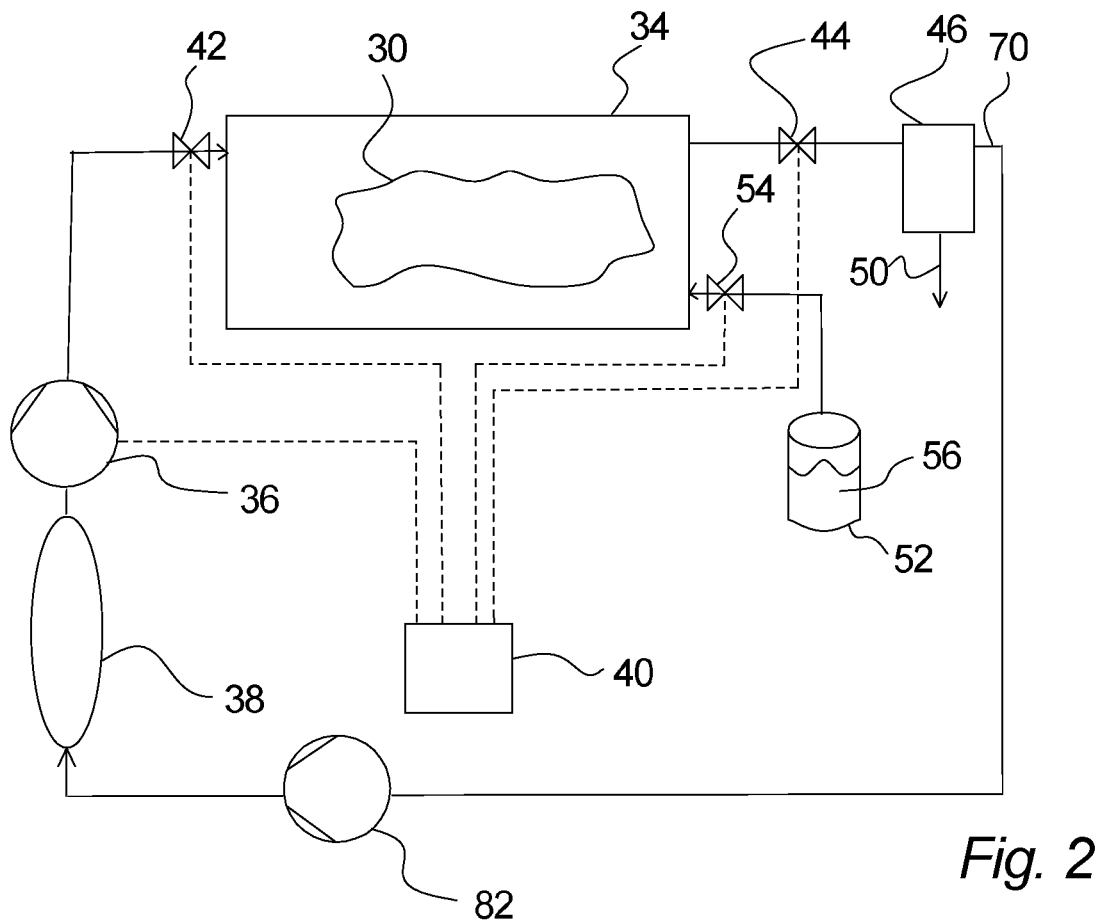

FIG. 2 illustrates an example of an apparatus in an embodiment of the invention as described in FIG. 1. FIG. 2 further comprises that the pressurized fluid may be circulated and reused after leaving the separator 46 with a recirculation connection 70 and a recirculation compressor 82 lead back into the storage container 38.

Figure 3:
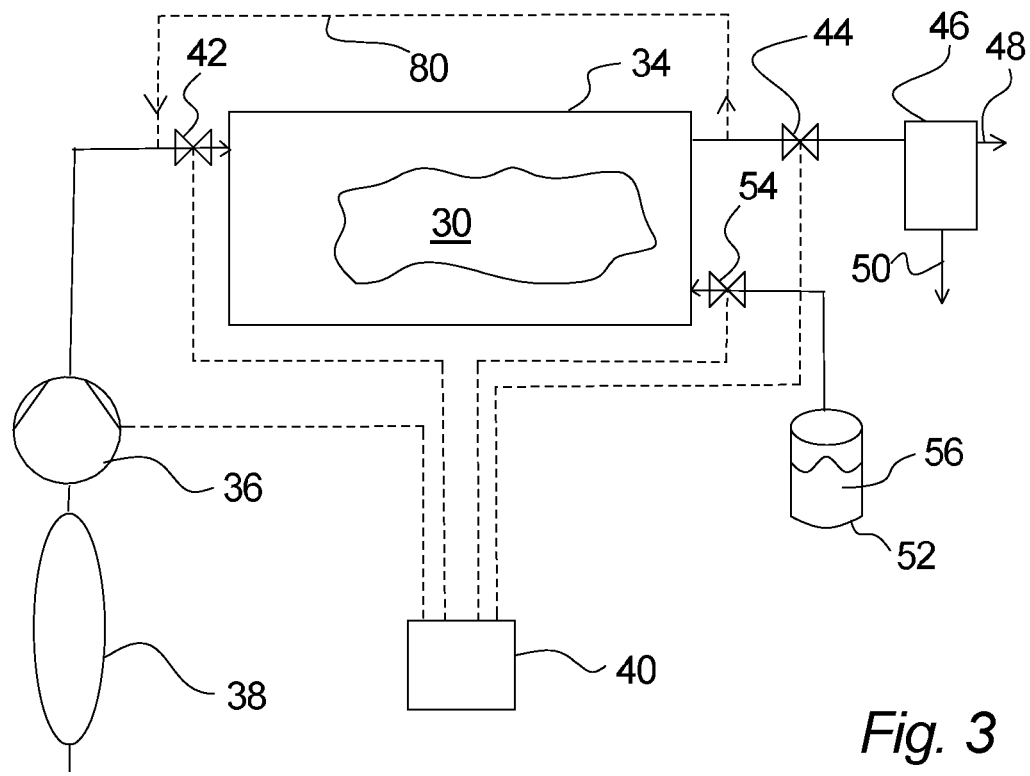

FIG. 3 illustrates an example of an apparatus in an embodiment of the invention as described in FIG. 1. FIG. 3 further comprises that the pressurized fluid may be circulated and reused from the pressurized chamber back in the pressurized chamber as illustrated with the recirculation connection 80.

Figure 4:
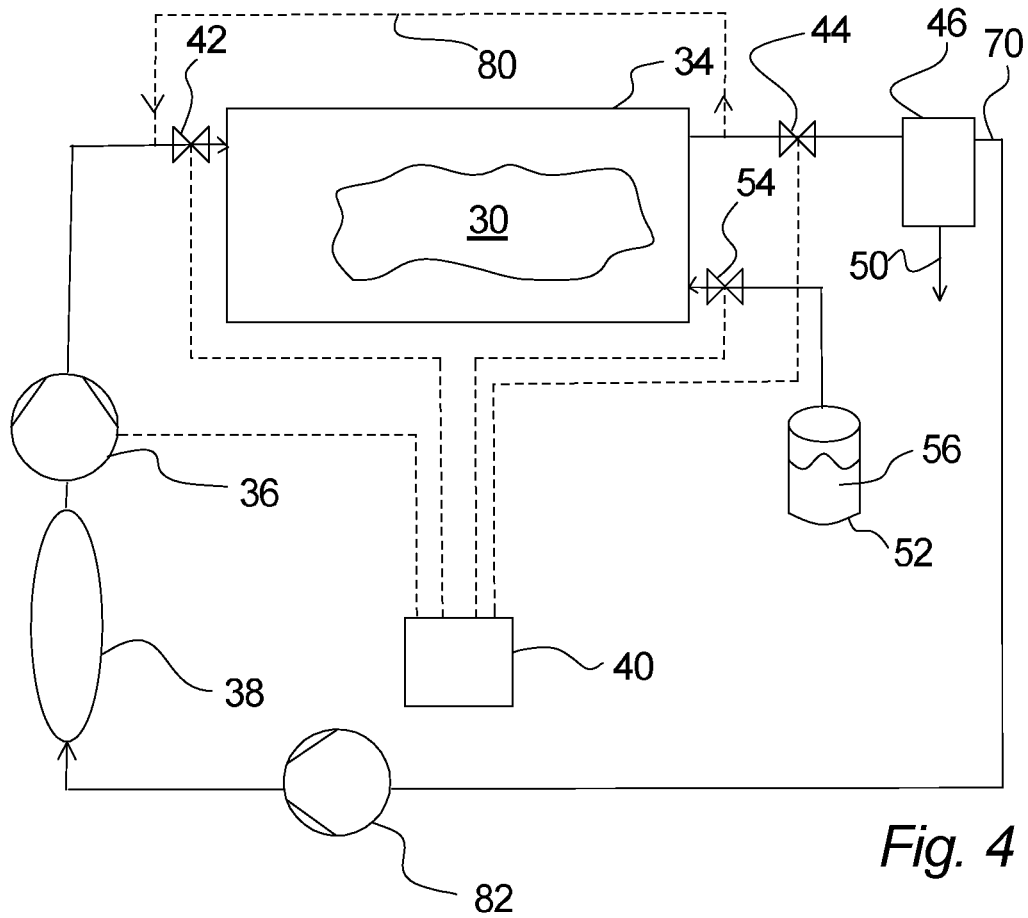

FIG. 4 illustrates an example of an apparatus in an embodiment of the invention as described in FIG. 1. FIG. 4 further comprises that the pressurized fluid may be circulated and reused after leaving the separator 46 with a recirculation connection 70 and a recirculation compressor 82 lead back into the storage container 38 and that the pressurized fluid may be circulated and reused from the pressurized chamber back in the pressurized chamber as illustrated with the recirculation connection 80.

FIG. 5 illustrates further possible embodiments of an apparatus according to the invention. The apparatus as shown in FIG. 5 corresponds essentially to the example shown in FIG. 4, but wherein it is further indicated that a temperature sensor 60 can be arranged within or in connection with the process chamber 34 in order to measure the temperature of the fluid, e.g. the supercritical fluid. The measured temperature is communicated to the controller 40 and based on e.g. controller software control signals may be communicated to a heater and/or cooler 62 in order to achieve a desired temperature of the fluid. It should be noted that the desired temperature of the fluid may depend on the pressure of the fluid and that a pressure sensor (not shown) may be arranged as well. Alternatively, a measure for the pressure of the pressurized fluid may be given by the controllable compressor 36 or the introducing member 42.

Furthermore, it is illustrated in FIG. 5 that two or more leather objects 30 may be processed in the process chamber 34 at the same time.

Even further, it is illustrated in FIG. 5 that the leather objects 30 may be supplied to the apparatus in an automated manner, for example with leather objects 30 being supplied to the process chamber 34 at least partly via a schematically shown supply 74 of leather objects 30, which for example may be a conveyer, a conveyor belt or the like. In connection with such a supply of leather objects 30, mass, thickness and/or volume detector means 72 may be arranged in order to determine leather characteristics that are of importance to the dyeing process. Such mass, thickness and/or volume detector means 72 may for example comprise radiation detection apparatus as indicated in FIG. 5, but other apparatus such as weighing cells, video monitoring and analysis, etc. may be used as well. The determined mass, thickness and/or volume of the leather objects may be communicated to the controller 40, which on the basis hereof may determine a corresponding amount of e.g. dye to be added to the fluid in the process chamber 34, when the specific leather object is to be dyed, and the controller 40 may communicate this to the controllable inlet 54, and possibly e.g. to the source of processing agent e.g. by a weight scale or volume scale. It should be noted that other parameters of the leather objects 30 may be provided by the detector means and used instead or in addition as input to the controller 40 for determining the necessary amount of dyeing agent. Such other parameters may be the surface area, the leather object type, e.g. texture or the like.

It should furthermore be noted that the leather objects 30 may be supplied in bulk to the apparatus and that they may be processed in bulk, e.g. with the weight of two or more of the leather objects 30 being provided as a bulk parameter and with the leather objects of the bulk being processed, e.g. dyed, at the same time.

Pressurized fluid may be in liquid form but may also be in gas form.

The leather object 30 may be a whole piece of leather without any pre-cutting or trimming or may be a piece or object of leather, e.g. a leather object that has been through a step of cutting or trimming. There may also be more than one pieces of leather materials in the process.

Dye may be introduced to the process chamber at the same time as the leather object but may also already be in the chamber or introduced after the leather object is subjected to the chamber.

The process chamber can have any form relevant for mediating the optimal conditions to maintain supercritical conditions over a time. In embodiments of the invention the process chamber and apparatus may in some relations appear in small scales and in other relations in big scales depending on the given applications.

Also, it should be noted that the process chamber 34 may comprise means for agitating the leather object(s) and the supercritical fluid in relation to each other, e.g. drum rotating means, rotating object carriers, a stirrer, etc. or other arrangements involving movement of the process chamber or parts thereof, but the apparatus may instead or in addition comprise e.g. pumping means for circulation of the supercritical fluid. The control of the process chamber may further comprise settings such as speed, direction movement etc.

FIG. 6 illustrates a further possible embodiment of an apparatus according to the invention. The apparatus as shown in FIG. 6 corresponds essentially to the example shown in FIG. 4, but the modification that will be explained in the following can be implemented in any other of the embodiments that are described herein. As described in connection with FIG. 4, the pressurized fluid may after the dyeing process, where the supercritical fluid with the dye has been circulated via the recirculation connection 80, leave the process chamber via the separator 46. However, as indicated in FIG. 6, the separator has been omitted and the separation of surplus dye can instead be performed within the process chamber 34, e.g. by reducing the pressure of the fluid, whereby any residue or surplus dye will be separated from the fluid and eventually fall to the bottom of the process chamber. When the surplus dye has been separated, the fluid, e.g. $CO_2$, can be e.g. pumped from the process chamber 34 via the reducing member 44, via the recirculation connection 70 and the recirculation compressor 82, Hereby, the fluid will be led back into the storage container 38. As regards the residue dye in the process chamber 34, this can be collected and/or a rinsing cycle can be made with e.g. $CO_2$ in order to clean the process chamber and its connections.

It should be noted that a rinsing cycle may be used as well in connection with other embodiments disclosed in the present application.

FIG. 7 illustrates a scale phase diagram for carbon dioxide (schematic and not to scale). Carbon dioxide behaves as a gas G in air at standard temperature and pressure or as solid S when frozen. When the temperature and pressure both are increased to be above the critical point CP for carbon dioxide, it adopts properties midway between gas and a liquid L. Here, it behaves as a supercritical fluid SCF above its critical temperature (31.1° C.) and critical pressure (73.9 bar).

FIG. 8*a* illustrates an exemplified timeline of the pressure P over time T, e.g. illustrating the condition in the process chamber 34 during a leather object dyeing cycle. The pressure may start at ambient A pressure t1 and at this point a leather object may be introduced into the process chamber. After a given time, the pressure is increased t2, e.g. by introducing and further pressurizing a pressurized fluid such as $CO_2$ and increases until a critical point of pressure CP t3. The gradient of the increase of pressure over time may be a steep increase wherein the pressure is increased over a shorter period of time or the increase may also be slower wherein the pressure is increased slower over a given time. Between t3 and t5 supercritical conditions are kept over a given time. The illustrated curve is in this example showed with a flat top with a constant pressure over time, however, the top could also have a pressure increase overtime extending directly into a decrease without having a constant pressure over time. After a given period of time t4 the pressure is decreased and decreases over time until ambient conditions are reached. The gradient of the decrease of pressure over time may be a steep decrease wherein the pressure is decreased over a shorter period of time or the decrease may also be slower wherein the pressure is decreased slower over a given time.

Dye may be added to the process chamber in the beginning of the process e.g. at t1 or t2 but may also be added later maybe during the supercritical conditions. Possible excess dye may be released and removed from the process chamber (or separated from the pressurized fluid leaving the process chamber) when the pressure decreases or when conditions have reached ambient conditions.

FIG. 8*b* illustrates a corresponding exemplified timeline of the pressure P over time T, wherein the essentially same pressure curve and the same points of time are shown as in FIG. 8*a*. Furthermore, it is illustrated as an example in FIG. 8*b* that dye is added to the process chamber at the time t7, i.e. after the liquid has reached the supercritical state. Consequently, as shown below the time axis (T-axis), the leather objects in the process chamber will be subjected to dyeing agent dissolved or diluted in the supercritical fluid for a period Td corresponding to t5-t7.

Further, it is illustrated in FIG. 8*b* that the pressure reaches a maximum value at t8, where after the pressure remains essentially constant until t4. Thus, as shown below the time axis (T-axis), the leather objects in the fluid will be subjected to a pressure increase for a period Tinc corresponding to t8-t2. Also, it is shown that the pressure gradient may be determined and monitored, here indicated as the numerical value IPgrad-iI. The apparatus may be configured to control the pressure increase by monitoring the period Tinc, which must exceed a predefined increase period such as e.g. 15 min. such as e.g. 25 min., such as e.g. 30 min. such as between 5 min. to 1 hour, such as 15 min. to 45 min., such as 15 min. to 30 min. or the apparatus may be configured to control the pressure increase by monitoring the pressure gradient, e.g. the numerical value IPgrad-iI. which must not exceed a predefined leather pressure increase gradient such as e.g. 20 bar/min, such as 15 bar/min, such as 10 bar/min, such as 8 bar/min, such as 6 bar/min, such as 5 bar/min or such as 4 bar/min.

Even further, it is illustrated in FIG. 8*b* below the time axis (T-axis), the leather objects in the fluid will be subjected to a pressure reduction for a period Tred corresponding to t6-t4. Also, it is shown that the pressure gradient may be determined and monitored, here indicated as the numerical value IPgrad-rI. The apparatus may be configured to control the pressure reduction by monitoring the period Tred, which must exceed a predefined reduction period such as e.g. 15 min. such as e.g. 25 min., such as e.g. 30 min such as between 5 min. to 2 hours, such as 15 min. to 45 min., such as 15 min. to 30 min, such as 30 min. to 2 hours, such as 30 min. to 65 min. or the apparatus may be configured to control the pressure reduction by monitoring the pressure gradient, e.g. the numerical value IPgrad-rI. which must not exceed a predefined leather pressure reduction gradient such as e.g. 10 bar/min, such as 8 bar/min, such as 6 bar/min or such as 4 bar/min.

The diagram is schematic and time intervals for pressurization and reduction may vary from each other, even considerably, and that pressurization may be much faster than depressurization, thus meaning that the curve may be relatively steeper for the pressurization FIG. 9 shows an example of a processing method for processing of leather objects according to an embodiment of the invention. Initially, a leather object is provided 102, e.g. either as a piece of leather that has not been cut or trimmed in advance or as a leather object that may be at least one pre-cut piece of leather. The leather object is placed into a process chamber 104 and subjected to pressurized fluid 106. The pressure of the pressurized fluid is increased until it reaches a supercritical state 108. It should be noted that the pressure may be increased further beyond the critical point and that furthermore, the temperature of the fluid may be controlled simultaneously to achieve a desired process. The leather object is subjected 110 to a processing agent such as a dyeing agent for a period of time. At the end of the processing period, the pressure is reduced 112 and the leather object is subsequently removed 114.

It should be noted in connection with the step 110 of subjecting the leather object to the processing agent that the processing agent may have been added to the pressurized fluid previously in connection with step 106 or in connection with step 108 and that even further the processing agent may have been introduced to the process chamber before or at step 104.

In the present context, pressurized fluid and fluid is represents a compound that adopts properties midway between gas and a liquid and behaves as a supercritical fluid.

Any substance is characterized by a critical point which is obtained at specific conditions of pressure and temperature. When a compound is subjected to a pressure and a temperature higher than its critical point, the fluid is said to be "supercritical".

Carbon dioxide is the most widely used supercritical fluid because it is a naturally occurring gas and readily available for industrial consumption.

Carbon dioxide usually behaves as a gas in air at standard temperature and pressure or as solid when frozen (dry ice). When the temperature and pressure both are increased to be above the critical point (CP) for carbon dioxide, it adopts properties midway between gas and a liquid. Here, it behaves as a supercritical fluid above its critical temperature (31.1° C.) and critical pressure (73.9 bar). In this way supercritical carbon dioxide has liquid-like densities, which is advantageous for dissolving dyes, and gas-like low viscosities and diffusion properties, which can lead to shorter dyeing times compared to water.

The critical point of the pressurized fluid may vary according to various conditions such as e.g. the density and/or purity of the fluid. The method for dyeing leather objects may therefore not only be possible in a supercritical state but also in near-supercritical state. Supercritical state and near supercritical may be used interchangeably in the present context. Thus, it should be understood that when in the claims and description of the present application reference is made to "pressurized fluid in the supercritical state" or similar terms, such terms will include a pressurized fluid that is in a near-supercritical state.

The term "super critical carbon dioxide" or "SC-CO2" may be used interchangeably in the present context. Also, carbon dioxide and $CO_2$ may be used interchangeable in the present context.

The term "dye" or the term "dyeing" is in the present context referring to dyeing substances other that chromium-based compounds as typically used within the art as tanning agents, although it is noted that e.g. chromium-based substances during conventional tanning typically results in a bluish coloring of the tanned leather. In the present context, dye or dyeing thus refer to substances added with the purpose of obtaining a desired colour. In other words, such a dyeing within the scope of the invention would preferably be performed at supercritical carbon dioxide conditions.

The inventive process of dyeing may be processed in a process chamber but generally, it should be noted that the dyeing process may be applied with any suitable dyeing equipment designed to dye according to the provisions of the invention.

The term leather or leather material refers to the skin of an animal prepared for use by tanning or a similar process designed to preserve it against decay and make it pliable or supple when dry.

Leather types that may be used within the scope of the invention may be any bovine derived type such as cow or calf. Examples of leather types that may be used within the scope of the invention may be types such as full grain or top grain leather, embossed grain leather, suede and nubuck.

In principle, the leather can derive from any source, including horse hide, goat skin, sheep skin, kangaroo hide and the like. Even so, preferably the leather is a mammal or marsupial leather (i.e. derives from a hide from a mammal such as a cow or horse, or a marsupial such as a kangaroo). Bovine leathers are most often used.

The term leather object refers to any piece of leather that may be used as either a whole piece or a pre-cut piece of leather. Leather in this context is broadly understood as objects containing leather parts. In other words, the leather object must contain animal skin parts which has been prepared for use by tanning or a similar process designed to preserve it against decay. A leather object may also include e.g. yarn or filament.

Leather objects may be pre-cut parts for e.g. a shoe, where such parts could e.g. be a vamp, toe cap, tongue, quarter or a heel cap.

Leather object may of course also refer to other types of leather, including clothing, clothing parts, leather accessories such as bag, leather parts of a bag, wrist straps, mobile phone covers, etc. Leather objects may also include leather parts related to automotive, e.g. leather objects for seats, leather objects for steering wheel covers, gear knob covers, etc.

Leather objects may also refer to objects containing leather parts, such as filament or yarn reconstructed from leather e.g. as disclosed in PCT/EP2018/053849, PCT/EP2018/053848, hereby included by reference. Such yarn or filament is thus understood as a leather object within the scope of the invention, as long as the small leather parts, also referred to as fibrils in the above-mentioned applications, originate from tanned leather, even if the leather object in such a case also includes an additive promoting the gathering of such small leather parts.

It should be noted that "a leather object" being processed within the scope of the invention, may mean that one, two or more leather objects may be processed at the same time.

Preferably the leather type is carefully selected based on its properties and chemicals used e.g. in pre-treatment of the leather e.g. during the tanning process.

In principle, the method may be carried out with any type of leather. However typically, the leather has already been tanned.

Tanning is used as the conventional ways of treating leather and may be applied to the invention. Depending on the compounds, the color and texture of the fabric may change. The technical definition of tanning is well known in the art, but briefly, according to Anthony D. Covington "Tanning Chemistry" chapter 10, the only strict definition of tanning is the conversion of a putrescible organic material into a stable material capable of resisting biochemical attack. Tanning involves a number of steps and reactions depending on the initial material and the final product.

In the case of collagen, it is the sidechains that largely define its reactivity and its ability to be modified by the stabilizing reactions of tanning when leather is made. In addition, the chemistry of the backbone, defined by the peptide links, offers different reaction sites that can be exploited in some tanning processes. During the tanning process, modification of collagen by the chemistry of the tanning agent(s) affects the different features of the properties of the material; The hydrophilic-hydrophobic balance of the leather may be markedly affected by the chemistry of the tanning agent by changing the relationship between the leather and the solvent, which in turn could affect the equilibrium of any reagent between the solvent and the substrate. Also, the site of reaction between the reagent and the collagen may affect the isoelectric point of the collagen and consequently there could be a different relationship between pH and charge on the leather. The lower the isoelectric point, the more anionic or less cationic the charge on the pelt may be at any pH value: the higher the isoelectric point, the more cationic or less anionic the charge on the pelt will be at any pH value. Further, the relative reactions at the sidechains and the backbone of the protein could possible determine the type of reaction and hence the degree of stability of the tannage: the fastness of the reagent may be influenced by the interaction between reagents and the substrate.

Any type of tanned leather may be used, including metal tanned (e.g. using chromium, aluminium, zirconium, titanium, iron or combinations thereof), vegetable tanned (e.g. using tannins from bark or other sources), aldehydic tanning (e.g. using aldehydes) or natural tanning e.g. oil tanning.

Tanning as a primary tanning may not be sufficient to maintain the desired characteristics and may therefore be re-tanned. The tannins used for this process may be different from those used in the primary tanning stage.

Fatliquoring refers to the process where fats/oils and waxes are fixed to the leather fibers. The primary function of fatliquoring is to prevent the fiber structure resticking during drying by providing an oil surface to the fiber structure. Any fatliquoring agents may be used, including anionic fatliquors such as sulfonated fatliquors and sulfited oils, soap fatliquors and cationic fatliquors. Nonionic fatliquors may also be used, including alkyl ethylene oxide condensates and protein emulsifiers. Multicharged fatliquors that are formulations of non-ionic, anionic and cationic fatliquors, may also be used for the fatliquoring process.

Raw material for the fatliquoring agents may be sea animal oils such as fish oil; land animal oils and fats such as claw oil, beef tallow, pig fat and bone fat; Vegetable oils and fats such as palm oil, sunflower oil, rapeseed oil, soybean oil, coconut fat, palm kernel fat and turkey red oil; waxes such as carnauba wax, montan wax and wool grease; synthetic fats such as paraffin oil, mineral oil, fatty alcohol and fatty acid ester.

As used herein, "at least one" is intended to mean one or more, i.e. 1, 2, 3, 4, 5, 6, 7, 8, 9, 10, etc.

The word "comprising" may be used as an open term, but it also includes the closed term "consisting of".

It should be noted that the present invention may be applied with a special advantage in relation to dye, but that the apparatus and method described herein also may be applied for the processing of leather with retanning agent in general. A retanning or a part of a retanning process may be performed e.g. by the application of supplementary tanning agent such as inorganic or organic substances. Inorganic retanning agent which could be applied instead of the above identified dye thus include chrome, aluminium, zirconium salts. Organic retanning agents include vegetable tannins, syntans, resins and aldehydes.

FIGURE REFERENCES

30. Leather object
34. Process chamber
36. Controllable compressor
38. Storage container
40. Controller
42. Introducing member
44. Reducing member
46. Separator
48. Outlet
50. Residue outlet
52. Source of processing agent
54. Controllable inlet
56. Processing agent
60. Temperature sensor
62. Heater and/or cooler
70. Recirculation connection
72. Mass, thickness and/or volume detector
74. Supply of leather objects
80. Recirculation connection
82. Recirculation compressor
102. Providing a leather object
104. Leather object into process chamber
106. Subjecting to pressurized fluid
110. Leather object subjected to a processing agent
112. Reducing the pressure
114. Removing the leather object
A. Ambient
CP. Critical point
G. Gas
L. Liquid
P. Pressure
S. Solid
SCF. Supercritical fluid
T. Time
Tinc. Time of pressure increase
Tred. Time of pressure reduction
IPgrad-iI. Pressure increase gradient
IPgrad-rI. Pressure reduction gradient
Td. Time of subjecting to dyeing agent

The invention claimed is:

1. An apparatus for processing of leather objects, said leather objects being pre-treated at least by a tanning process, said apparatus comprising:
a process chamber,
a controllable compressor for pressurizing a fluid,
a pressure reducing member,
an inlet for a processing agent, and
a controller,
wherein:
said process chamber is configured in a form of a pressure chamber,
said controllable compressor for:
pressurizing the fluid is configured for introducing pressurized fluid into the process chamber from a source of said fluid, controlled by the controller, and
providing a predefined pressure in the process chamber in order to reach a supercritical state of said fluid,
said inlet for the processing agent is configured for facilitating introduction of said processing agent into the process chamber prior to, during, or subsequent to pressurization of the fluid,
said pressure reducing member is configured for, controlled by the controller, reducing the pressure of the pressurized fluid at least to reach a gaseous state subsequent to processing of said leather object such that a time for reduction of the pressure exceeds a predefined reduction period of between 5 min. to 2 hours.

2. The apparatus according to claim 1, wherein the apparatus is configured for pressurizing the pressurized fluid in the process chamber to reach the supercritical state, controlled by the controller, such that:
the time for increasing the pressure exceeds a predefined increase period, or
the increase of the pressure does not exceed a predefined leather pressure increase gradient.

3. The apparatus according to claim 1, wherein said process chamber comprises a closeable member for inletting and outletting leather objects.

4. The apparatus according to claim 1, wherein said pressure reducing member is controlled in dependence of time and/or at least one pressure sensor variable.

5. The apparatus according to claim 1, wherein the apparatus further comprising a separator connected to an outlet of said pressure reducing member, said separator being configured for separating processing agent residue from the fluid.

6. The apparatus according to claim 5, wherein said apparatus comprising a pipe for recycling fluid from the separator to a storage container operating as a fluid source for the apparatus.

7. The apparatus according to claim 6, wherein the controllable compressor is a first compressor, and
wherein said apparatus further comprises a second compressor for pumping the fluid from the separator to the storage container.

8. The apparatus according to claim 1, wherein said inlet for the processing agent comprises one of:
an inlet direct to the process chamber,
an inlet to the fluid being pressurized to be introduced into the process chamber, and
an inlet combined with an inlet for skin, hide, or leather objects into the process chamber.

9. The apparatus according to claim 1, wherein the predefined pressure in the process chamber in order to reach the supercritical state of said fluid is at least 70 bar.

10. The apparatus according to claim 1, wherein the apparatus further comprises temperature control apparatus, controlled by the controller, for maintaining a temperature of the pressurized fluid, which is in the supercritical state in the process chamber, in a temperature range of between 30 to 120 degrees Celsius.

11. The apparatus according to claim 1, wherein the apparatus further is configured for reducing the pressure of the pressurized fluid in the process chamber to a level corresponding to ambient pressure subsequent to processing of said leather object.

12. The apparatus according to claim 1, wherein the apparatus is configured such that the time for increasing the pressure to reach the supercritical state exceeds a predefined increase period of 5 min.

13. The apparatus according to claim 1, wherein said apparatus is configured for controlling the pressure and temperature of the fluid in the supercritical state to achieve and/or maintain a desired density of the fluid in the supercritical state.

14. The apparatus according to claim 1, wherein the time, during which the leather object is subjected to the processing agent in the pressurized fluid in the supercritical state, is at least 1 min.

15. An apparatus for processing of leather objects, said leather objects being pre-treated at least by a tanning process, said apparatus comprising:
a process chamber;
a controllable compressor for pressurizing a fluid;
a pressure reducing member;
an inlet for a processing agent; and
a controller,
wherein:
said process chamber is configured in a form of a pressure chamber,
said controllable compressor for:
pressurizing the fluid is configured for introducing pressurized fluid into the process chamber from a source of said fluid, controlled by the controller, and
providing a predefined pressure in the process chamber in order to reach a supercritical state of said fluid,
said inlet for the processing agent is configured for facilitating introduction of said processing agent into the process chamber prior to, during, or subsequent to pressurization of the fluid,
said pressure reducing member is configured for, controlled by the controller, reducing the pressure of the pressurized fluid at least to reach a gaseous state subsequent to processing of said leather object such that the reduction of the pressure does not exceed a predefined leather pressure reduction gradient of 10 bar/min.

16. An apparatus for processing of leather objects, said leather objects being pre-treated at least by a tanning process, said apparatus comprising:
a process chamber;
a controllable compressor for pressurizing a fluid;
a pressure reducing member;
an inlet for a processing agent; and
a controller,
wherein:
said process chamber is configured in a form of a pressure chamber,
said controllable compressor for:
pressurizing the fluid is configured for introducing pressurized fluid into the process chamber from a source of said fluid, controlled by the controller, and
providing a predefined pressure in the process chamber in order to reach a supercritical state of said fluid,
said inlet for the processing agent is configured for facilitating introduction of said processing agent into the process chamber prior to, during, or subsequent to pressurization of the fluid,
said pressure reducing member is configured for, controlled by the controller, reducing the pressure of the pressurized fluid at least to reach a gaseous state subsequent to processing of said leather object such that:
a time for reduction of the pressure exceeds a predefined reduction period, or
the reduction of the pressure does not exceed a predefined leather pressure reduction gradient, and
the apparatus is configured such that an increase of the pressure does not exceed a predefined leather pressure increase gradient of 20 bar/min.

* * * * *